US006980377B1

(12) United States Patent
Larson et al.

(10) Patent No.: US 6,980,377 B1
(45) Date of Patent: Dec. 27, 2005

(54) CHROMATIC VIGNETTING IN LENS SYSTEMS

(75) Inventors: Brent D. Larson, Cave Creek, AZ (US); Matthew B. Dubin, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 14 days.

(21) Appl. No.: 10/856,966

(22) Filed: May 28, 2004

(51) Int. Cl.[7] .............................. G02B 9/08; G02B 3/00
(52) U.S. Cl. ...................... 359/738; 359/722; 359/723
(58) Field of Search ............................... 359/722, 723, 359/738, 739, 740

(56) References Cited

Primary Examiner—David N. Spector
(74) Attorney, Agent, or Firm—Andrew A. Abeyta

(57) ABSTRACT

Methods and apparatus are provided for chromatic vignetting in lens systems. The apparatus includes a projection lens unit having an aperture stop, and a selective filter positioned at the aperture stop. The aperture stop defines a ray bundle boundary of an image passing therethrough. The selective filter includes a transmission area having an optical perimeter based on the ray bundle boundary, and a wavelength band filter partially extending from the optical perimeter into the transmission area. The projection lens unit may be used with an illumination unit having a light source and optics conditioning the light from the light source prior to illumination of a light valve. The selective filter may optionally be positioned at a conjugate plane to the aperture stop in the illumination unit. The method includes passing ray bundles through a lens system having an aperture stop, and selectively filtering one of at least one wavelength band at a boundary of the ray bundles at the aperture stop and at least one wavelength band at a boundary of the ray bundles at a conjugate plane.

18 Claims, 4 Drawing Sheets

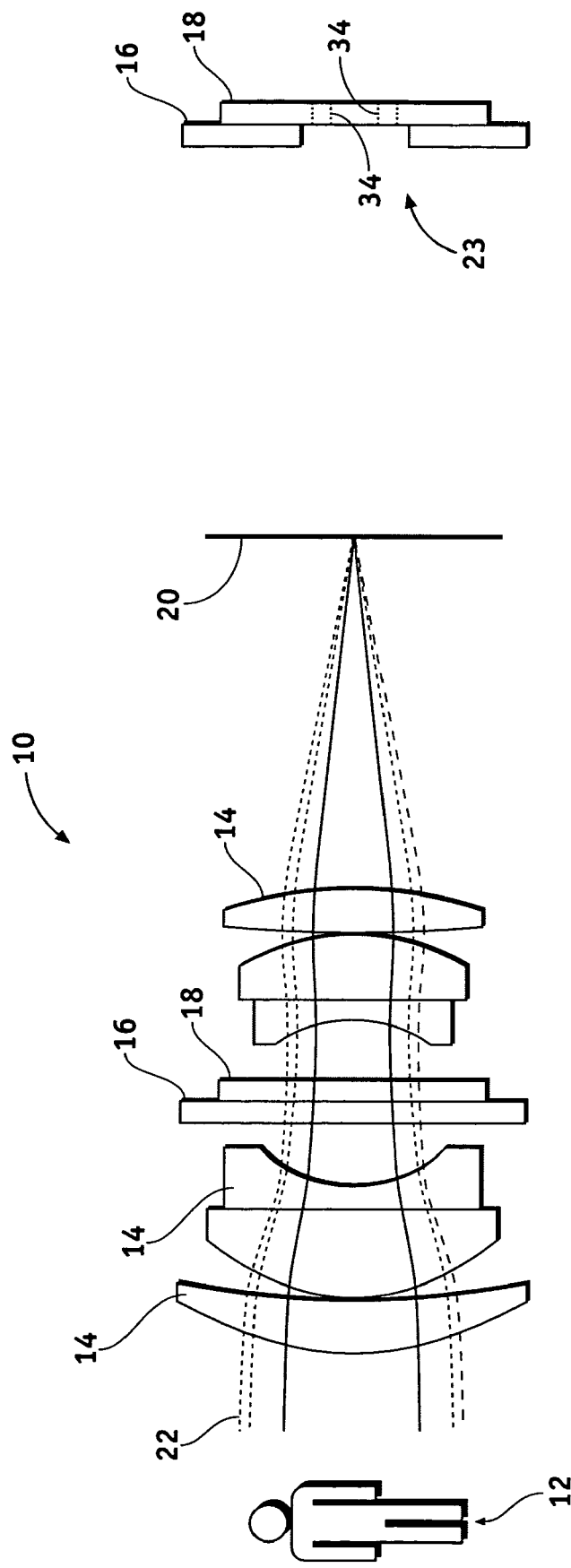

CHROMATIC VIGNETTING IN LENS SYSTEMS

FIELD OF THE INVENTION

The present invention generally relates to projection display systems, and more particularly relates to correcting chromatic aberrations in projection displays.

BACKGROUND OF THE INVENTION

Projection displays have numerous home and commercial applications. For example, rear-projection television displays commonly occupy numerous households. Displays have also been important as information-conveying devices, such as those used in aircraft to provide terrain or flight information data. For example, avionics displays are used to provide a generally visually reliable indication of in-bound terrain, aircraft status, or other flight information that may be used for real-time decision-making.

Lenses are prominently used in projection displays for imaging. In an ideal situation, a point on an object or subject is imaged to a point on a displayed image. However, individual lenses in general may have inherent defects that result in chromatic aberrations such as blur or distortion. To minimize chromatic aberrations, lens systems are used where individual lenses are selected and combined to offset or counter chromatic aberrations for each of the individual lenses. Selecting the particular combination of lenses to minimize chromatic aberrations remains a complex and difficult process, and chromatic aberrations commonly remain in the projected image although minimized to a degree.

When designing a wide angle, fast lens for use with a broad spectral distribution, chromatic aberrations of such lens can be particularly difficult to correct. For example, compact projection displays used in bright ambient conditions commonly have relatively smaller display size and a larger field of view. To operate in high ambient conditions, the lens used in such displays may need to be fast as well. The limited types of lamps used in such displays may further complicate matters. For example, Mercury lamps commonly used in avionics displays are difficult to correct for about 435 nm light. The use of special glass types having undesirable properties may be required to correct chromatic aberrations.

An additional problem that arises from the use of certain types of light sources is a mismatch of the projection display white point with a desired white point. When this happens, it is generally preferable to alter the light source spectrum to obtain an appropriate color. For light sources having independently adjustable color or wavelength bands, such as a cathode ray tube, altering the light source spectrum to obtain the appropriate color is relatively straightforward. Certain types of light sources may have a fixed spectral distribution. For example, in such light sources the relative amount of light in different color bands can be difficult to independently adjust in the source. Changing the spectral distribution of these light sources may be possible, but generally this change is difficult after manufacturing. Typically, any change to these light sources may be done by changing the total light output or, alternatively, the range of achievable change is relatively small. Arc lamps and single die white light emitting diodes (LEDs) are examples of these types of sources. Often, one or more of the color bands used in a projection display system will have more light than needed to obtain the desired white point. If this is the case, one or more of the color bands generally should be adjusted to remove extra light and move the white point to the desired location. This adjustment can be done with light valves that are used to create an image, but it is more desirable to maintain the full performance range of the light valve for image generation.

Accordingly, it is desirable to provide projection display systems having minimized chromatic aberrations. It is also desirable to correct the white point of a display that uses a source with a fixed spectral distribution. In addition, it is desirable to provide lens systems for use in projection displays having chromatic vignetting to correct chromatic aberrations. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for chromatic vignetting in lens systems. In one exemplary embodiment, a projection system includes a projection lens unit having an aperture stop that defines a ray bundle boundary, an illumination unit having a conjugate plane based on the aperture stop, and a light conditioning optic positioned at one of the aperture stop and the conjugate plane. The light conditioning optic includes a transmission area having an optical perimeter based on the ray bundle boundary, and a wavelength band filter partially extending from the optical perimeter into the transmission area.

In another exemplary embodiment, an imaging system includes a projection lens unit having an aperture stop, an illumination unit having a conjugate plane based on the aperture stop, and a selective filter positioned at one of the aperture stop and the conjugate plane. The filter includes a wavelength band filtering portion having an internal perimeter and a non-filtering portion having a boundary contiguous with the internal perimeter of the wavelength band filtering portion.

A method is provided for correcting chromatic aberrations in a projection system. The method includes the steps of conditioning light from a light source with a first lens system, illuminating a light valve with the conditioned light, generating an image with the light valve where a ray bundle is associated with each point on the light valve, imaging the image through a second lens system having an aperture stop, and selectively filtering a wavelength band at the perimeter of the ray bundles at one of the aperture stop and a conjugate plane of the aperture stop at the first lens system.

BRIEF DESCRIPTION OF THE DRAWINGS

The present invention will hereinafter be described in conjunction with the following drawing figures, wherein like numerals denote like elements, and FIG. 1 is a schematic diagram of an exemplary embodiment of a lens system;

FIG. 2 is a detail view of the aperture stop and the chromatic filter shown in FIG. 1;

DETAILED DESCRIPTION OF THE INVENTION

Figure 3:
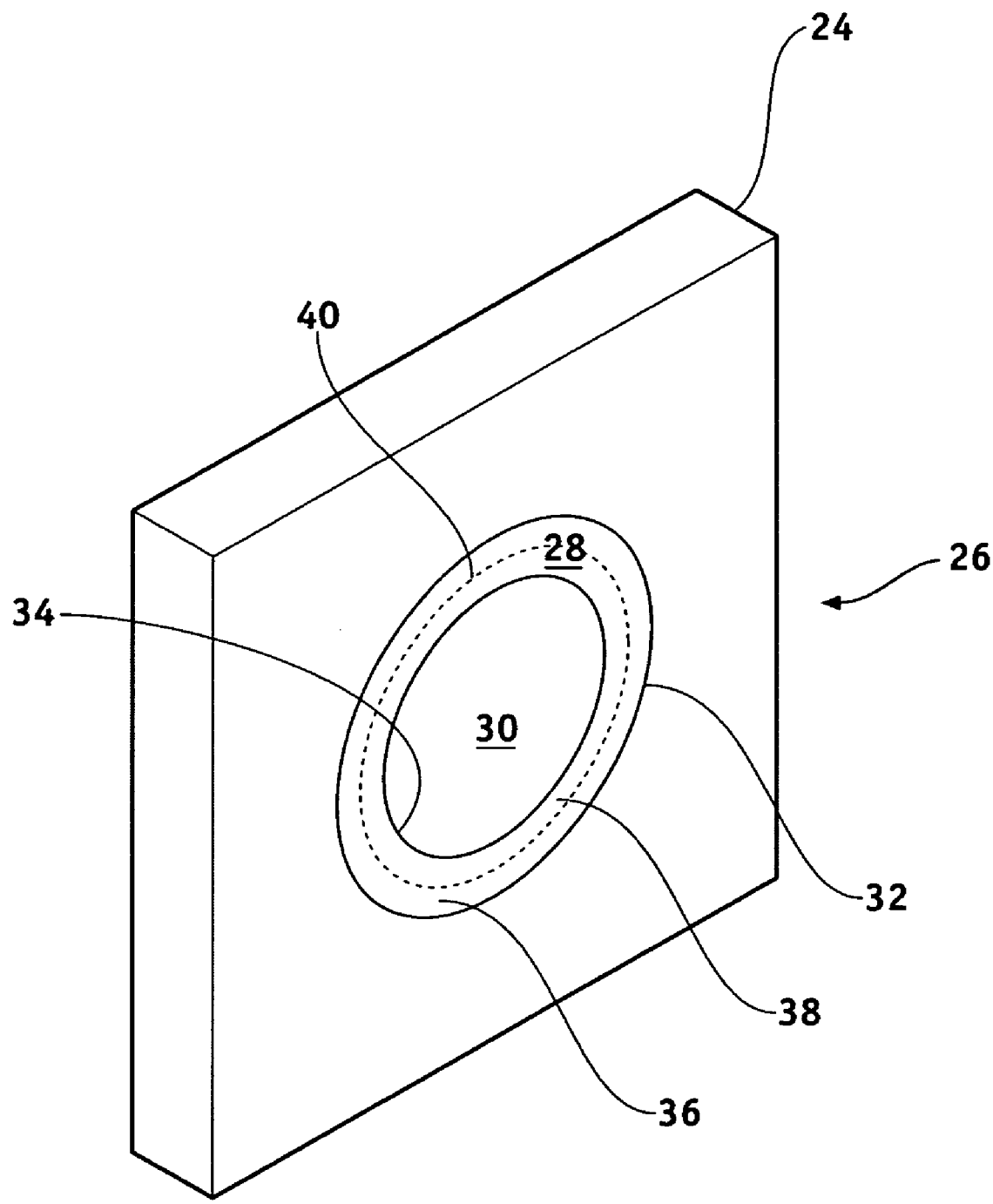
FIG. 3 is a perspective view of an exemplary embodiment of a chromatic filter.

The following detailed description of the invention is merely exemplary in nature and is not intended to limit the invention or the application and uses of the invention. Furthermore, there is no intention to be bound by any theory presented in the preceding background of the invention or the following detailed description of the invention.

Lens aberrations generally vary with wavelength, but three types of chromatic aberrations in particular can generally have significant impact on image quality. These chromatic aberrations include longitudinal color, sphero-chromatism, and lateral color. Longitudinal color refers to a variation in focus position with varying wavelength. Typically, light may be considered in focus over a particular range of distances, which is commonly referred to as a depth of focus. In general, providing a region where the depth of focus, for desired wavelengths, overlaps is desirable. For a more robust application, this overlap region should be as large as possible. Even if the magnitude of longitudinal color is not reduced, increasing an F number of a lens for certain color bands generally increases the depth of focus for those color bands.

Sphero-chromatism refers to a variation in spherical aberration with varying wavelength. Spherical aberration generally varies as a fourth power of a corresponding aperture size and can have significant impact on image quality. For example, reducing the area of an aperture by a factor of two may reduce associated spherical aberration by a factor of four.

Lateral color refers to a variation of magnification with varying wavelength. In general, lateral color does not vary significantly with the size of a pupil, but reducing the speed of a lens may have a small impact on lateral color. Lateral color may be corrected using substantially low and anomalous dispersion glasses. These glasses often have undesirable properties that make lenses including such glasses expensive. By slightly reducing the lateral color in the lens, avoiding the use of some or all of such types of glasses may be possible.

By manipulating the aforementioned three chromatic aberrations in a projection display system having a light source with a fixed spectral distribution that is desired to be changed, unwanted light in some of the color bands can be minimized and even significantly removed by effectively stopping down the lens only for those color bands. For example, if both blue and green light need to be removed from a projection display system in order to obtain a desired white point, the lens system can be made slower for blue and green while maintaining the original speed for red. This results in a system with the desired white point and reduced chromatic aberration in the blue and green color bands. While the spectral variations of aberrations are generally the largest for shorter wavelengths, benefits may also be derived from stopping-down mid- or longer wavelengths.

According to various exemplary embodiments, a projection display system includes at least one chromatic filter for correcting chromatic aberrations. Each chromatic filter selectively attenuates different color or wavelength bands. Positioning the chromatic filter at an aperture stop of the projection system associated with the projection display system or at a conjugate plane to the aperture stop, such as found in an illumination system associated with the projection display system, reduces chromatic aberrations originally present in the projection display system.

Referring now to the drawings, FIG. 1 is a schematic diagram of an exemplary embodiment of a lens system, shown generally at 10. The lens system 10 may include any number and variety of lenses 14 depending on a desired image to be projected. For example, a different set of lenses having different optical properties may be used for a wide angle lens system in comparison with a more traditional lens system. For example a different set of lenses having different optical properties may be used for a wide angle lens system in comparison with a telephoto lens system. The lens system 10 also includes an aperture stop 16 and a chromatic filter 18 positioned adjacent to the aperture stop 16 that selectively attenuates different wavelength bands. Those of skill in the relevant art will appreciate that location of the aperture stop 16 may vary depending on the configuration of lenses 14 in the lens system 10. A light valve 20 is shown with a ray bundle 22 that is associated with one point on the light valve 20. Although many other ray bundles are present but not shown, corresponding to other points on the light valve, the depiction of the ray bundle 22 is for convenience of explanation. The lens system 10 forms an image of the light valve 20 at an image location 12. Often, a projection screen (not shown) may be located proximate to the image location 12.

FIG. 2 is a detail view of the aperture stop 16 and the chromatic filter 18 shown in FIG. 1. The dimensions and shape of the ray bundles passed by the lens system 10 may be based on a variety of factors including, by way of example and not limitation, a receiving pupil, an illumination system, and additional optics for conditioning the image prior to reception by the lens system 10 such as a second lens system or array. The ray bundles received by the lens system 10 have a boundary 22 that varies as the image passes through various components of the lens system 10, such as a lens or aperture stop. For example, if the aperture stop 16 has a variable opening, shown generally at 23, such as an iris, that varies between a maximum opening and a minimum opening, this variation respectively varies the ray bundle size and boundary corresponding to the size of the opening. Although the chromatic filter 18 and aperture stop 16 are shown in two slightly different locations in FIG. 2, the chromatic filter 18 may also be positioned in the same plane as the aperture stop 16.

FIG. 3 is a perspective view of an exemplary embodiment of a chromatic filter 24. Although the filter 24 is shown in FIG. 3 in a plate-shaped embodiment, the filter 24 may be any desired shape or size, such as a circular or disk shaped filter. The filter 24 includes a transmission area, shown generally at 26, having optical characteristics that selectively attenuate different wavelengths for a portion of the transmission area 26. For example, the transmission area 26 may have a filter portion 28 and a transparent portion 30 adjacent to the filter portion 28. The transparent portion 30 is substantially transparent to all desired wavelength bands used in a projection system. In one embodiment, the transparent portion 30 is contiguous with the filter portion 28. The transmission area 26 has an optical perimeter 32 surrounding the transmission area 26 that is based on the ray bundle boundary 22. For example, the optical perimeter 32 may be substantially the same as the ray bundle boundary or coextensive with the ray bundle boundary. The optical perimeter 32 may also be substantially the same size as the maximum opening of the aperture stop 16 or coextensive with the maximum opening of the aperture stop 16. It is also possible that the optical perimeter 32 be the aperture in the system that acts as the aperture stop 16. Although the optical perimeter is described herein with respect to the ray bundle boundary, the particular dimension of the optical perimeter is not critical to the present invention and may be varied to extend beyond the ray bundle boundary.

In one embodiment, the filter portion 28 partially extends inwardly from the optical perimeter 32 and shares a border 34 with the transparent portion 30. The extent that the filter portion 28 extends from the optical perimeter 32 may depend on the type and magnitude of the chromatic aberrations and the amount of light that needs to be removed from different color bands. For example, a mercury lamp may have too much blue light for some projection applications. In this example, the filter portion 28 may be yellow in color to create an aperture stop for shorter wavelengths that coincides with the boundary 34 between the filter portion 28 and the transparent portion 30 and an aperture stop for longer wavelengths that coincides with the optical perimeter 32. It is also possible to have a separate aperture that acts as the aperture stop 16 for the longer wavelengths. Although the embodiment of the filter portion 28 shown in FIG. 3 appears as a circular band, the particular shape of the filter portion 28 may vary with the shape of the optical perimeter 32 and the border 34 shared between the filter portion 28 and the transparent portion 30. Further, the filter portion 28 may take other forms such as occupying multiple segregated regions of the transmission area 26, concentric circular bands separated by a border 40, or a central circular or elliptical region, and is limited only to the extent that the filter portion 28 does not completely occupy the transmission area 26.

Additionally, the filter portion 28 may be graded to selectively filter different wavelengths at different regions of the filter portion 28. For example, the filter portion 28 may have an outer region 36 that attenuates short and middle wavelengths and an inner region 38 that attenuates only middle wavelengths. In this example, the filter portion 28 may have a substantially continuous grade for attenuating wavelengths from the longer wavelengths to the shorter wavelengths of the visual spectrum.

In another example, if twice as much blue and green light is provided than needed, a red color filter may be placed at the aperture stop of the lens. The red color filter should be shaped or configured such that the filtering region is located substantially around the edge of such aperture. In this example, if the red filter covered half of the area of the aperture, blue and green light is reduced by a factor of two and the lens is stopped down by a full stop for the blue and green light. Because the speed of the lens is generally a significant factor in affecting the magnitude of the aberrations, such aberrations are significantly reduced for the blue and green light.

Although the filter 18 is described in the embodiment shown in FIG. 1 as being located at the aperture stop of the lens system, the filter may be located adjacent to other components of a projection display system. For example, vignetting using the chromatic filter may be included in different or multiple lenses and the filter, or multiple filters, can be used to provide spectrally dependent vignetting. If this is done, it may be necessary to ensure that any vignetting, as a function of image position, is consistent between color bands. For example, vignetting of wavelengths associated with the larger aperture can be matched with the vignetting associated with the smaller aperture to minimize color shift with position in the image location. One implementation of this example is to limit vignetting to a small number of surfaces such that a filter is located at each surface to provide constant vignetting with image position for all wavelengths.

Figure 4:
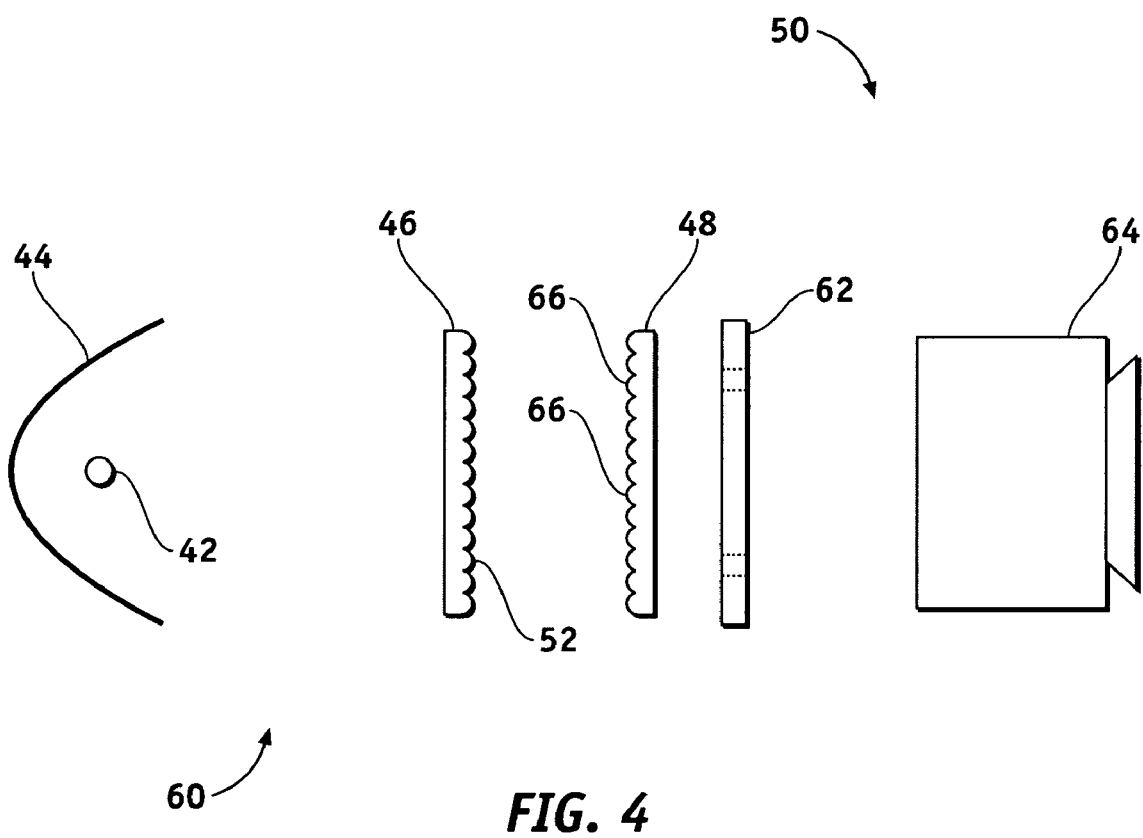
FIG. 4 is a schematic diagram of an exemplary embodiment of a projection display system.

FIG. 4 is a schematic diagram of an exemplary embodiment of a projection display system, shown generally at 50, having a illumination unit, shown generally at 60, a projection unit 64 receiving light from the illumination unit 60 and having an aperture stop (not shown), and a chromatic filter 62 positioned in a conjugate plane to the aperture stop. The illumination unit 60 may be a fly's eye homogenizer that includes a light source 42, a reflector 44, a first lens array 46, and a second lens array 48. Other types of illumination systems may be used provided such systems have a plane conjugate to the aperture stop. The light source 42 provides a source of light for the system 50. The reflector 44 reflects the light from the light source 42 and converts the light to a substantially parallel beam in the direction of the first lens array 46.

The first lens array 46 includes a plurality of positive lenses 52 that divide the light into an array of smaller light beams directed toward the second lens array 48. The second lens array 48 includes a plurality of positive lenses 66, and each of the smaller light beams from the first lens array 46 is focused to pass through one of the lenses 66 in the second lens array 48. In this embodiment, the second lens array 48 is placed proximate to a plane that is conjugate to the aperture stop and is therefore imaged into the aperture stop by intervening optics (not shown). Those of skill in the relevant art will appreciate that additional conventional optics, such as lenses, collimators, reflectors, prisms, etc., may be used with the projection display system to condition the light.

By placing the chromatic filter 62 at a plane conjugate to the aperture stop of the projection unit 64, a number of advantages may be realized. One advantage of placing the filter 62 near the second lens array 48 of the illumination unit 69 is that light is partitioned spatially such that edge effects of the filter 62 may be ignored because no useful light passes through the filter near the edge. In this embodiment, the filter may be manufactured in large areas and cut to a desired size thereby decreasing production complexity and cost. Another advantage of placing the filter near the second lens array 48 is a simpler implementation of robust control over the color changes introduced by the filter 62. For example, the number of lenses that the filter 62 covers can be controlled generally without precise positioning of the filter 62. Yet another advantage of placing the filter 62 near the second lens array 48 is to allow for use of a lens not designed for use with a broad spectral distribution.

Figure 5:
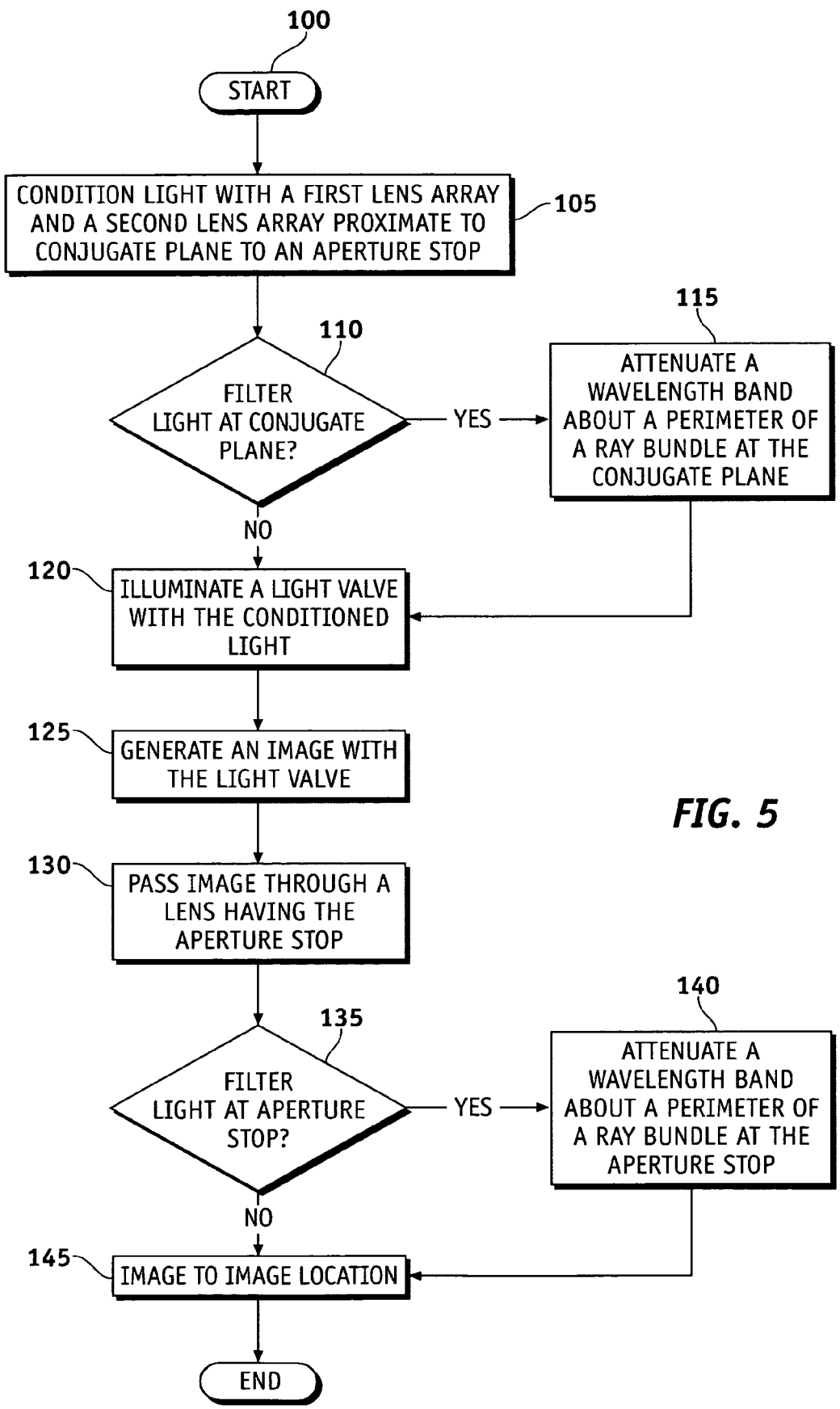
FIG. 5 is a flow chart of an exemplary method of correcting chromatic aberrations in a projection system.

FIG. 5 is a flow chart of a method of correcting chromatic aberrations in a projection system. The method begins at 100. Light is generated from a light source, such as an arc lamp, and optionally conditioned. In one embodiment, the light is conditioned at 105 by the first lens array 46 and the second lens array 48 that is proximate to a conjugate plane to the aperture stop 16. As previously mentioned with respect to the embodiment shown in FIG. 4, the first lens array 46 divides the light into an array of smaller light beams directed toward the second lens array 48. The second lens array 48 is imaged to the aperture stop 16 by intervening optics and has a conjugate plane corresponding to the plane of the aperture stop 16.

A determination is made at 110 whether filtering of the light is desired at the conjugate plane. If filtering at the conjugate plane is desired, then a pre-determined wavelength band is attenuated about a perimeter of the light beam at the conjugate plane at 115 using the chromatic filter 62. In one embodiment, the wavelength band is attenuated using a filter having a wavelength attenuating portion adjacent to the perimeter of the light beam and a transparent portion contiguous with the wavelength attenuating portion.

Depending on the particular components of a projection system, a light valve is illuminated at 120 with the light conditioned by the first and second lens array 46, 48, for example. The light valve may be a variety of conventional image producing devices including, by way of example and not limitation, transmissive liquid crystal displays (LCDs), reflective LCDs, micro-mirror devices, or passive image storage media. The light valve generates an image at 125 that is directed to a projection unit.

The image from the light valve passes through the lens or lens system 10 at 130. A determination is made at 135 whether filtering of the image is desired at the aperture stop 16 of the lens system 10. If filtering at the aperture stop 16 is desired, then a pre-determined wavelength band is attenuated about a perimeter of the ray bundle at the aperture stop 16 at 140 using the chromatic filter 18, 24. In one embodiment, the wavelength band is attenuated using a filter having a wavelength attenuating portion adjacent to the perimeter of the ray bundle and a transparent portion contiguous with the wavelength attenuating portion. After passing through the lens system 10, the image is imaged to the image location at 145 by the lens system 10. Using the chromatic filter, a desired white point is achieved while substantially maintaining the full performance range of the light valve for image generation.

While the previous embodiments describe a system with a light source, light valve, and projection lens, other imaging systems may also be used. One example is a camera system having adjustment of white point or control of chromatic aberration.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A projection system comprising:
    a projection lens unit having an aperture stop, said aperture stop defining at least one ray bundle boundary; and
    a light conditioning optic positioned proximal said aperture stop, said light conditioning optic comprising:
        a transmission area having an optical perimeter based at least partially on said at least one ray bundle boundary; and
        a wavelength band filter positioned adjacent said optical perimeter and at least partially extending into said transmission area from said optical perimeter.

2. A projection system according to claim 1, wherein said wavelength band filter is configured to attenuate at least one of a red wavelength, a green wavelength, and a blue wavelength.

3. A projection system according to claim 1, wherein said wavelength band filter is configured such that a first range of wavelengths are attenuated in a region of said wavelength band filter proximal to said optical perimeter and a second range of wavelengths are attenuated in a region of said wavelength band filter distal to said optical perimeter, said first range of wavelengths shorter than said second range of wavelengths.

4. A projection system according to claim 1, wherein said aperture stop is configured to vary between a first opening and a second opening, said first opening greater than said second opening; and wherein said optical perimeter of said transmission area is coextensive with said first opening.

5. A projection lens unit comprising:
    a first aperture stop passing a plurality of ray bundles therethrough, said first aperture stop configured to define at least one ray bundle boundary for a first wavelength band; and
    a second aperture stop positioned proximal said first aperture stop and passing said plurality of ray bundles therethrough, said second aperture stop configured to define at least one ray bundle boundary for a wavelength band subset of said first wavelength band.

6. A projection system according to claim 5, wherein said at least one ray bundle boundary of said second aperture stop is within said at least one ray bundle boundary of said first aperture stop.

7. An imaging system comprising:
    a projection lens having an aperture stop;
    an illumination unit configured to provide light, said illumination unit having a conjugate plane based on said aperture stop;
    a light valve configured to produce an image from the light; and
    a chromatic filter positioned at at least one of said aperture stop and said conjugate plane, said filter comprising:
        a wavelength band filtering portion having an external perimeter and an internal perimeter; and
        a transparent portion having a boundary contiguous with said internal perimeter of said wavelength band filtering portion.

8. An imaging system according to claim 7, wherein said wavelength band filtering portion attenuates at least one of a red wavelength, a green wavelength, and a blue wavelength.

9. An imaging system according to claim 7, wherein said wavelength band filtering portion is configured such that a first range of wavelengths are attenuated proximal to the external perimeter and a second range of wavelengths are attenuated proximal to the internal perimeter, said first range of wavelengths shorter than said second range of wavelengths.

10. An imaging system according to claim 7, wherein said illumination unit comprises:
    a light source;
    a first lens system configured to receive light from said light source; and
    a second lens system configured to receive light from said first lens system and positioned proximal the conjugate plane.

11. An imaging system according to claim 10, wherein said light conditioning optic is positioned at the conjugate plane adjacent said second lens system.

12. An imaging system according to claim 10, wherein said first lens system and said second lens system are both lens arrays.

13. An imaging system according to claim 7 further comprising a diffusing screen configured to receive a projected image from said projection lens unit.

14. A method of correcting chromatic aberrations of an image, said method comprising the steps of:

selectively filtering a first wavelength band at a first ray bundle boundary of the image; and selectively filtering a wavelength band subset of the first wavelength band at a second ray bundle boundary of the image proximal to the first ray bundle boundary.

15. A method in accordance with claim 14 further comprising the step of imaging the image to at least one of an aperture stop and a conjugate plane to the aperture stop.

16. A method in accordance with claim 15, wherein said first wavelength band filtering step comprises the step of attenuating a first range of wavelengths in at least a portion of a plurality of ray bundles proximal to the first ray bundle boundary.

17. A method in accordance with claim 16, wherein said wavelength band subset filtering step comprises the step of attenuating a second range of wavelengths in at least a portion of a plurality of ray bundles proximal to the second ray bundle boundary, the second range of wavelengths being a subset of the first range of wavelengths.

18. A method in accordance with claim 14, wherein said wavelength band subset filtering step comprises the step of attenuating at least one of a red wavelength, a green wavelength, and a blue wavelength.

* * * * *